INVENTOR.
WALTER P. KISTLER

Feb. 21, 1967
W. P. KISTLER
3,304,775
SKIN FRICTION GAUGE
Filed Aug. 3, 1964
5 Sheets-Sheet 2
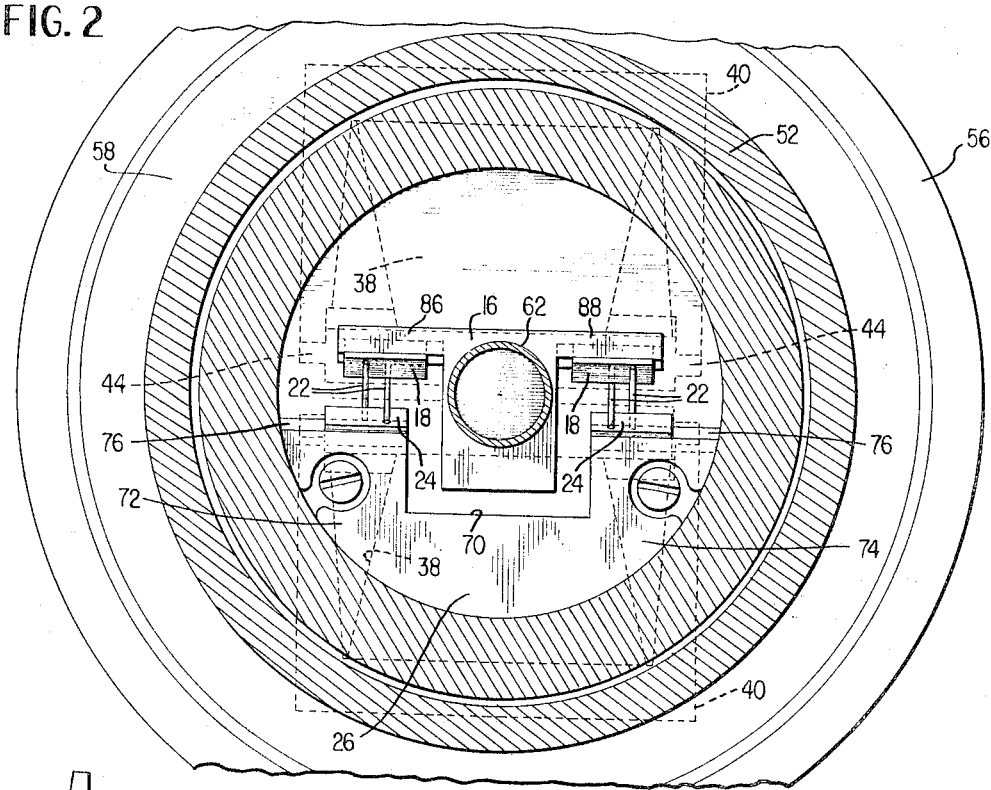
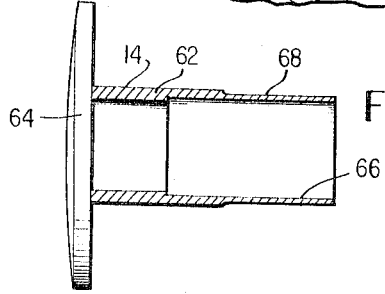
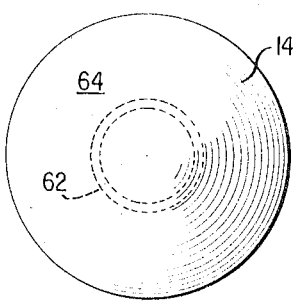
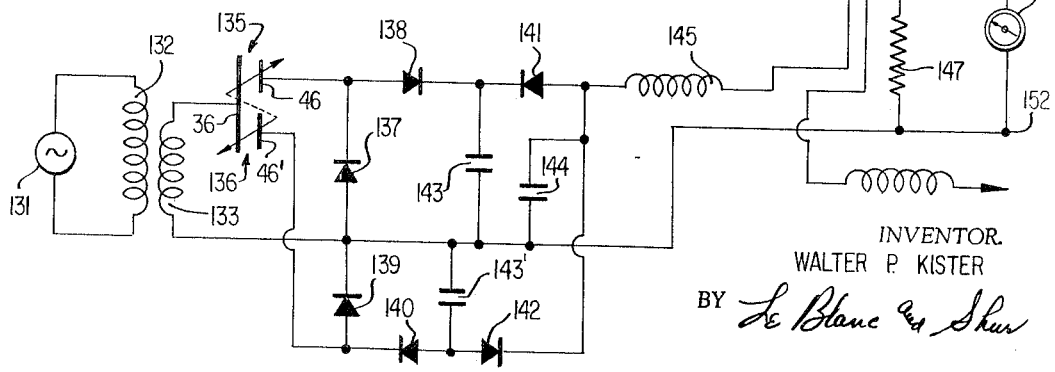
INVENTOR.
WALTER P. KISTER
BY *Le Blanc & Shur*
ATTORNEYS Feb. 21, 1967
W. P. KISTLER
3,304,775
SKIN FRICTION GAUGE
Filed Aug. 3, 1964
5 Sheets-Sheet 3
FIG. 5
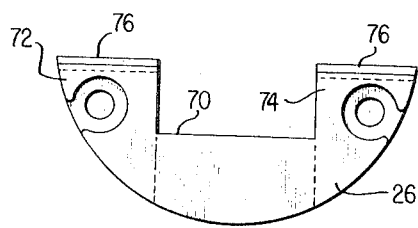
FIG. 6
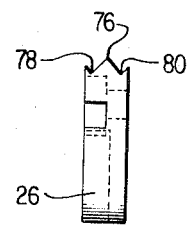
FIG. 7
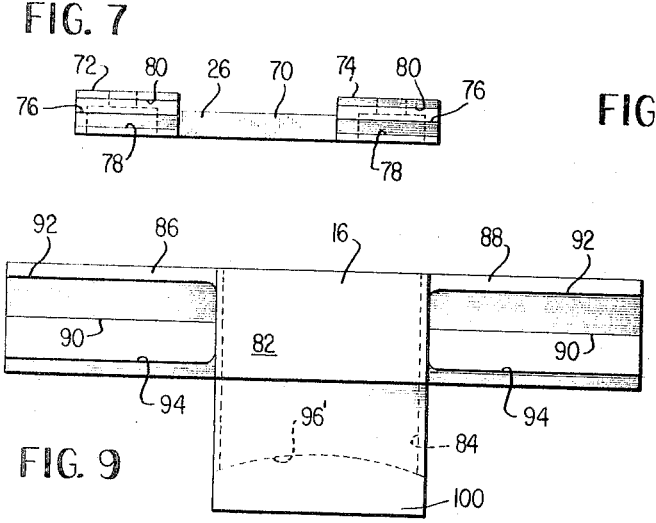
FIG. 8
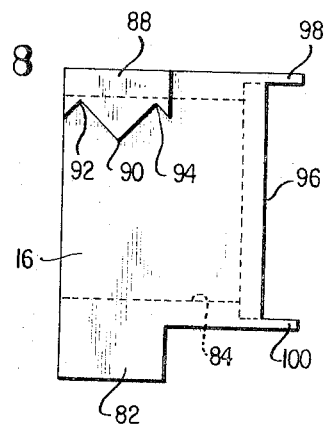
FIG. 9
FIG. 10
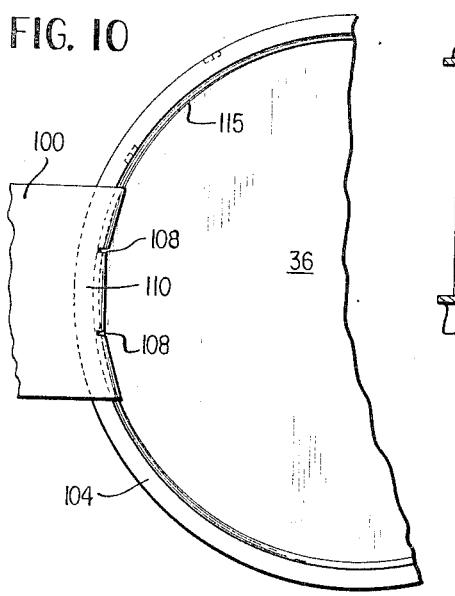
FIG. 11
INVENTOR.
WALTER P. KISTLER
BY *Le Blanc and Shur*
ATTORNEYS Feb. 21, 1967 W. P. KISTLER 3,304,775
SKIN FRICTION GAUGE
Filed Aug. 3, 1964 5 Sheets-Sheet 4

INVENTOR.
WALTER P. KISTLER
BY *LeBlanc and Shur*
ATTORNEYS.

United States Patent Office 3,304,775
Patented Feb. 21, 1967

3,304,775
SKIN FRICTION GAUGE
Walter P. Kistler, Clarence, N.Y., assignor to Kistler
Instrument Corporation, Clarence, N.Y.
Filed Aug. 3, 1964, Ser. No. 386,915
10 Claims. (Cl. 73—147)

This invention relates to aerodynamic drag measuring devices and more particularly to a skin friction gauge of the force balance or servo type in which the force created by air drag applied to a small surface is counter-balanced by an electromagnetic force generated by current flowing in a servo loop and energizing a coil free to move in a magnetic field. The gauge employs a capacitive pickoff having high sensitivity and range.

The effect of "skin friction" is present when a body moves relative to gas or fluid and is due to the existence of gas or fluid viscosity. When a body moves through a viscous media, some particles of the media will adhere to the surface of the body and a boundary layer is produced. The variation in the magnitude of velocity from the body to the free stream media creates shear, and hence a force called drag. This force is becoming increasingly important to aerodynamicists since it leads to aerodynamic heating and retards speed.

Various viscosity measuring instruments are well known but few are adapted for incorporation in a moving vehicle such as an aircraft or a missile. Furthermore, none is readily suited to the measurement of skin friction acting on the surface of the vehicle involving not only high speeds and large accelerations but also excessive temperature of as much as 2000° F. Some instruments have been fabricated to measure skin friction drag but for the most part these have been limited to use in conjunction with wind tunnel testing and have been particularly constructed for use with reaction or other types of wind tunnel mounts. In general these instruments are not of the force balance type, are clearly unsuited for incorporation in a moving vehicle and characteristically possess limited range, resolution, sensitivity, linearity and frequently response. Even if incorporated in high speed vehicles, the known instruments lack the compactness and simplicity of the instrument of the present invention, and are unduly sensitive to linear accelerations and gravity.

The present invention avoids the above mentioned difficulties by providing a novel gauge particularly suited for skin friction viscosity-type measurements, which gauge may be subjected to temperatures in the order of 2000° F. during measurement and therefore may be used in space re-entry vehicles, high Mach number shock tubes, blast furnaces, and the like. The instrument employs a small sensing element which is a portion of the surface where it is desired to measure the skin friction drag. This small element is free to move relative to the surrounding area but any motion of the sensing element causes a corresponding motion of a differential capacitive pickoff. The change in differential capacitance causes unique electric circuitry to produce a corresponding current. The flow of current through a coil mechanically attached to the pickoff and sensing element and located in a strong magnetic field creates a force which opposes the outside force that tends to cause displacement of the sensing element. The measure of this current is a measure of the external drag force. The electronic circuitry is of simplified design and is contained in the same casing with the mechanical parts, thus providing an instrument of small size, great ruggedness, and higher accuracy and range than heretofore possible.

It is therefore one object of the present invention to provide a novel viscosity measuring device.

Another object of the present invention is to provide a novel skin friction gauge.

Another object of the present invention is to provide a novel electronic sensing circuit for gauging devices.

Another object of the present invention is to provide a force balance type skin friction gauge incorporating a capacitive pickoff.

Another object of the present invention is to provide an instrument employing a small sensing element which is a portion of the surface where it is desired to measure skin friction drag. The small element is free to move relative to the surrounding area, but any motion of the element causes a corresponding motion of a differential capacitive pickoff. The change in pickoff position is electronically sensed to produce a corresponding current and the flow of the current through a coil mechanically attached to the pickoff and sensing element and located in a strong magnetic field, creates a force which opposes the outside force that tends to cause displacement of the sensing element.

Another object of the present invention is to provide an instrument of the class described wherein a drag element is mounted flush with the skin of the drag surface. The clearance between a ring surounding the element and the drag element is held to a very small value to prohibit the flow of gases around the drag element. Capacitor pickoff plates detect any motion of the drag element relative to the ring.

Another object of the present invention is to provide a skin friction gauge having a sensing element wherein the sensing element is provided with a novel motion-limiting suspension. The suspension employed allows rotation around a preferential axis but is rigid to rotation around any other axis and resists linear motion in any direction. The suspension also serves to make electrical connections to the pickoff elements and to the coils. The arrangement is directly calibratable by the use of known weights. A second coil is included to generate forces to calibrate the instrument in the event weight calibration is inconvenient.

These and further objects and advantages of the invention will be more apparent upon reference to the following specification, claims and appended drawings wherein:

FIGURE 2 is a cross section taken along line 2—2 of FIGURE 1;

FIGURE 3 is an enlarged view of the sensing element shown in FIGURE 1;

FIGURE 4 is an end view of the sensing element of FIGURE 3;

FIGURE 5 is an enlarged view of the stationary suspension support of FIGURES 1 and 2;

FIGURE 6 is a side view of the support of FIGURE 5;

FIGURE 7 is a plan view of the support of FIGURE 5;

FIGURE 8 is an enlarged view of the movable suspension support of FIGURE 1;

FIGURE 9 is a bottom plan view of the movable suspension support of FIGURE 8;

FIGURE 10 shows the attachment of the upper suspension support to the coil form or spool;

FIGURE 11 is a cross section through the spool showing the manner of attachment of the movable capacitor plate to the spool;

FIGURE 18 is an electrical circuit diagram for the skin friction gauge of FIGURE 1;

Figure 1:
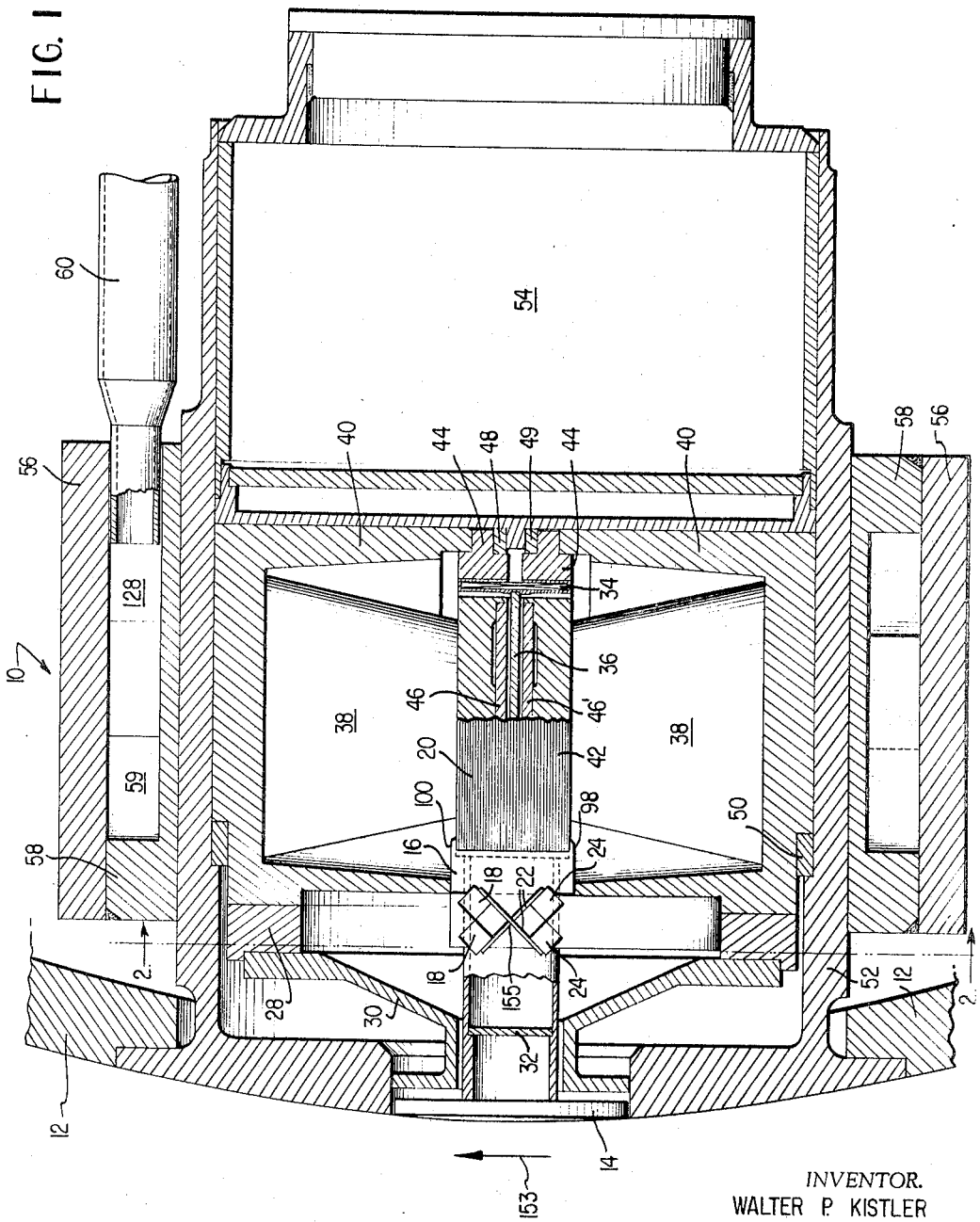
FIGURE 1 is a cross section through the novel skin friction gauge of the present invention.

The gauge of the present invention as illustrated in the drawings is constructed to measure the skin friction drag of a high velocity vehicle. The gauge is provided with transistorized electronic circuitry and a magnetic coil assembly, both cooled preferably to approximately 100° C. The surface of the sensing or drag element is constructed to withstand temperatures up to 2000° F. for periods of one-half hour or more. This in conjunction with substantial insensitivity to acceleration and rugged mechanical construction makes the gauge capable of withstanding the high temperature and other environmental conditions involved in re-entry flight.

Referring to the drawings and particularly to FIGURES 1 and 2, the skin friction gauge of the present invention generally indicated at 10, is suitably connected to a surface 12 at which the skin friction drag or aerodynamic drag is to be measured, such as the surface of a space vehicle. Briefly, the gauge 10 comprises a sensing element 14 which may be flat but preferably is contoured as illustrated to fit the surrounding curved surface 12. This sensing element is attached to a movable suspension support 16 which carries the suspension arm insulation blocks 18 connected to four crossed flat suspension arms 22. Support 16 also attaches to a force coil spool 20. Flexible suspension arms are connected at their other ends to fixed insulated suspension blocks 24. The blocks are electrically insulated so that the suspension arms 22 may be used to provide paths for electrical currents to the pickoff plates and to the coils on the spool 20. The fixed blocks are attached to a fixed suspension support 26 which is attached to the body 28 of the instrument.

A heat shield 30 serves to reflect heat radiated by the sensing element 14 when it is subjected to high temperatures and to conduct heat into the body of the instrument where the heat may be dissipated and removed. A heat baffle in the form of a disk 32 also reflects heat from the sensing element and protects the suspension area.

The coil form or spool 20 carries a double winding 34, one of the windings of which (called the forcer coil) is used to generate a force to oppose drag forces acting on the sensing element while the other winding is supplied with a current for calibration, compensation, or other purposes. The double coil surrounds an insulated and movable capacity plate 36 which serves as a position indicator. Two conically shaped permanent magnets 38 are employed although one will suffice. Each of these magnets is mounted in a soft iron cup 40 and each magnet is provided with a soft iron pole piece 42. A soft iron ring 44 for each magnet 38 completes the magnetic circuit.

Each of the soft iron pole pieces 42 receives a fixed insulated capacity plate 46 which receives charge from the energized moving capacity plate 36 carried by the spool. Shims 48 and 49 are used to adjust the fixed capacity plates relative to the moving plate 36. A further shim 50 adjusts the body of the instrument 28 so that the sensing element 14 is in correct relationship with the instrument case 52. The case 52 is also contoured as illustrated to conform with the surrounding surface 12. The electronic circuitry generally illustrated at 54 receives signals from the capacitive pickoff and generates a current to supply the forcer coil of double winding 34. This circuitry also contains an oscillator to supply excitation to the moving capacitive plate 36.

A clamping nut 56 is used to retain the case 52 in position and surrounds a core 58 provided with a zigzag passage 59 and a pair of tube connections one of which is illustrated at 60. Water is passed through these tubings and the zigzag passage 59 to cool the gauge.

Referring to FIGURES 3 and 4, the sensing element 14 takes the form of a hollow cylindrical tube 62, terminating in a substantially flat but slightly contoured head 64 which is curved to conform to the surface in which the gauge is inserted. Tube 62 is provided with an enlarged central aperture 66 and a reduced outer diameter portion 68 adapted to be received with a press fit within the hollow end of the movable suspension support 16, as more fully described below.

Referring to FIGURES 5 through 7, the lower or fixed suspension support 26 is provided with a central cutout portion 70 providing clearance for the upper or movable suspension support and sensing element, so as to define a substantial U-shape. Upwardly extending legs 72 and 74 on opposite sides of the cutout portion 70 are each provided with a central ridge 76 and troughs 78 and 80 so as to firmly engage the lower or fixed suspension blocks 24 of FIGURES 1 and 2.

FIGURES 9 and 10 in conjunction with FIGURE 2 show the details of the upper or movable suspension support 16. The movable support 16 comprises a rectangular L-shaped block 82 provided with a central tubular aperture 84 adapted to be received with a sliding fit over the reduced end 68 of the sensing element 14 of FIGURE 3. Extending outwardly from the rectangular block 82 are a pair of wings 86 and 88 which receive the insulated movable mounting blocks 18. These wings are similarly provided with a central ridge 90 and with troughs 92 and 94, for receiving the mounting blocks. The opposite end of the central tubular aperture 84 is cut back as at 96 in FIGURE 8 to define a pair of overhangs or ledges, 98 and 100, adapted to engage the spool 20 of FIGURE 1. This cutback 96 is curved as illustrated in FIGURE 9 to conform to the outer circular surface of the spool.

Referring to FIGURES 10 and 11, spool 20 is circular and comprises an outer rim 102, having spaced flanges 104 and 106. The ledges 98 and 100 of the movable suspension support 16 of FIGURE 8 pass over the flanges 104 and 106 and are provided with cutouts such as 108 in FIGURE 10, which provide a weakened portion 110 which may be bent down to engage within the interior of the spool 20, so as to firmly clasp the rim of the spool between the two ledges 98 and 100. Rim 102 of the spool is also provided with an internal rib 114 adapted to receive interiorly of the spool rim the movable capacitor plate 36. Capacitor plate 36 is preferably made of insulating material, coated on both sides with a layer of conductive metal, such as silver. The opposite conductive layers are suitably electrically connected together and the plate is soldered to the conductive spool as at 115. The double coil winding 34 of FIGURE 1 is received around the rim 102 and lies within the space defined by the rim and the outermost surfaces of the two rim flanges 104 and 106.

Figure 12:
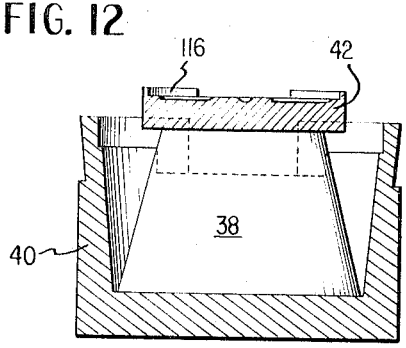
FIGURE 12 is a cross section through one of the soft iron cups of FIGURES 1 and 2 showing a conical permanent magnet.
Figure 13:
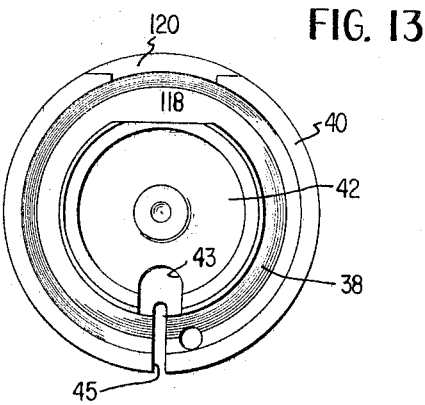
FIGURE 13 is a plan view of the magnet and cup of FIGURE 12.

FIGURES 12 and 13 show the details of one of the permanent magnets 38 and its enclosing soft iron cup 40. Secured to the end of the conical magnet 38 is the soft iron pole piece 42 having a rim 116 for receiving one of the stationary capacitive plates 46 of FIGURE 1. Rim 116 is partially cut away at 118 to provide clearance for the movable suspension support 16. One side of the cup is similarly cut away at 120 to also provide clearance for the support 16. The pole piece is also cut away at 43 to provide clearance for a wire 45 establishing electric connection to the fixed capacitor plate received in the pole piece.

Figure 14:
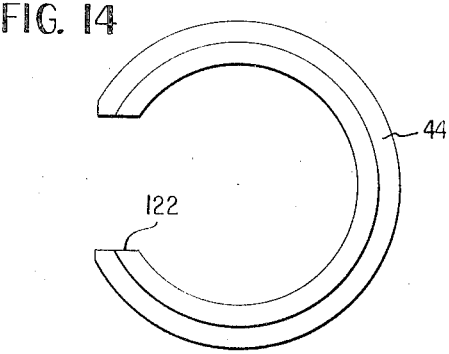
FIGURE 14 shows one of the soft iron rings of FIGURES 1 and 2.

FIGURE 14 is a plan view of one of the soft iron rings 44 of FIGURE 1 and shows the ring cut away at 122 likewise to provide a clearance for the upper suspension support 16. Each ring 44 is press-fit into its respective cup 40 in FIGURE 1.

Figure 15:
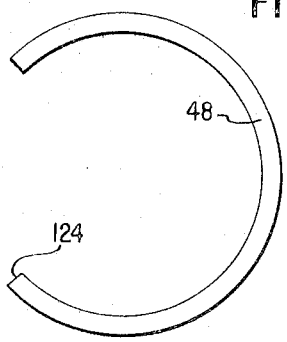
FIGURE 15 shows one of the adjusting shims of FIGURES 1 and 2.

FIGURE 15 is a view of the shim 48 in FIGURE 1 and similarly shows the shim cut away at 124 to provide clearance for the support 16. The outer shim 49 is constructed similarly to shim 48, but of course may be of different thickness.

Figure 16:
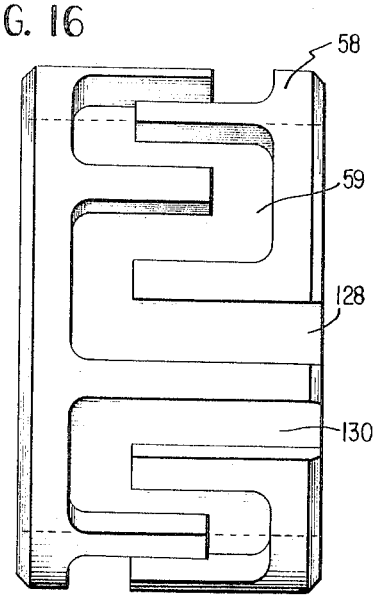
FIGURE 16 is an elevational view of the cooling jacket core of FIGURE 1.
Figure 17:
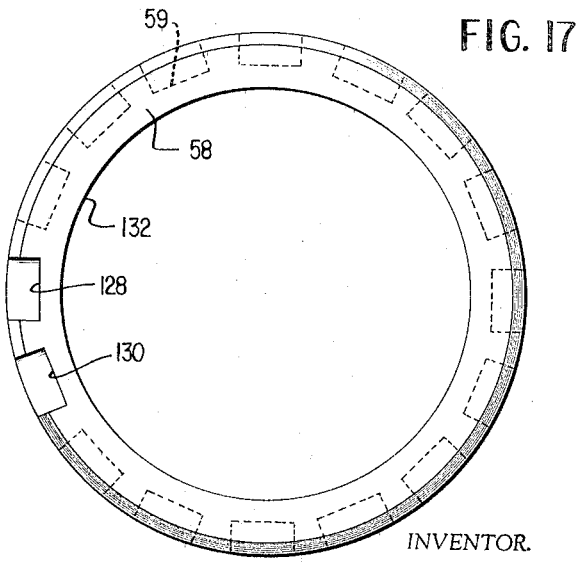
FIGURE 17 is an end view of the core of FIGURE 16.

FIGURES 16 and 17 show the details of the cooling jacket core 58 which is surrounded in FIGURE 1 by the nut 56 sealing off the core against the exit of water. Core 58, as best seen in FIGURE 16, is provided with the zigzag passageways 59 having an inlet such as 128 and an outlet 130. The inlet and outlet are each adapted to receive a tube connection similar to that illustrated at 60 in FIGURE 1, so that water may be passed through the passageway 59 completely around the surface of the jacket core. The core is provided with the central aperture 132 adapted to tightly fit around casing 52.

FIGURE 18 is a circuit diagram for the electrical portion of the gauge of FIGURE 1 including the capacitive plates and the electronic circuitry illustrated generally by the package 54 in FIGURE 1. In FIGURE 18, the movable plate is again indicated by the reference numeral 36, and the stationary plates are indicated by the reference numerals 46 and 46′. The two variable capacitances formed by these plates are indicated by the reference numerals 135 and 136.

An electronic A.C. generator 131 produces a high frequency voltage which is fed to a transformer having a primary 132 and a secondary 133. The transformer is used so that the output signal may be isolated for low frequencies from the generator. If this feature is not necessary, the transformer may be omitted. The secondary 133 energizes the gauge's moving plate 36. Charge flows from the plate 36 to the stationary plates 46 and 46′ in the following manner. On the negative half cycle from secondary 133 electrons flow through a rectifier diode 137 to plate 46 of capacitor 135 charging it to the peak value of the applied voltage. On the following positive cycle this charge plus the charge produced by the positive cycle, flows through another diode 138, and a zener diode 141 to a summing capacitor 144. Simultaneously, electrons flow through a rectifier diode 139 to plate 46′ of capacitor 136. On the following negative half cycle, charge flows from capacitor 136 through a diode 140 and a zener diode 142 to capacitor 144. This current is opposite to the current from zener diode 141 and it is equal to it in magnitude if the capacitors 135 and 136 are equal. This cancellation of currents leaves capacitor 144 with zero volts across it and no current flows through force winding 145. If plate 36 receives a displacement, then either capacitor 135 will increase while capacitor 136 decreases, or the reverse will occur. Under these circumstances the currents at capacitor 144 do not cancel and a voltage appears across capacitor 144. This permits a current to flow through the winding 145 to a load resistor 147 and meter 154.

Zener diode 141 is used to prevent current from diode 142 from flowing through diodes 137 and 138 until the voltage across capacitor 144 exceeds the breakdown voltage of zener diode 141. Likewise, zener diode 142 prevents current from zener 141 from flowing through diodes 140 and 139. The two capacitors 143 and 143′ provide filtering of the high frequency signals. The current through force winding 145 that creates a force to oppose motion of the spool, also flows through load resistor 147 which develops a signal across output terminals 151 and 152 proportional to the generated force.

In operation, movement of the vehicle in which the gauge 10 is mounted through a fluid medium produces a drag force on sensing element 14 in the direction of the arrow 153 in FIGURE 1. This causes the tube 62 of the drag element to tend to pivot about a preferential axis so as to move sensing head 64 in the direction of this drag force. Because of the mounting provided by the support arms 22, this preferential axis is perpendicular to the sheet of paper in FIGURE 1 and passes through the apparent crossover point 155 of the arms. The pivotal axis may vary slightly in conjunction with the very limited movement of the sensing element but this variation is so small as to be negligible. The novel suspension arrangement including the arms 22 and supporting blocks 18 and 24, limit the motion of the sensing element to that of pivotal motion about the axis 155. The sensing element is rigid to rotation about any other axis and resists linear motion in any direction. This is brought about by the fact that the arms 22 cannot be elongated or shortened and cannot be flexed in the direction of their wider cross sectional dimensions. However, the arms which are preferably made of metal are flexible in the direction of their short cross sectional dimension to permit pivotal movement about axis 155. The arms may be slightly resilient if desired but this is not necessary. Excessive resilience is, of course, undesirable in providing too large a restoring force.

Figure 19:
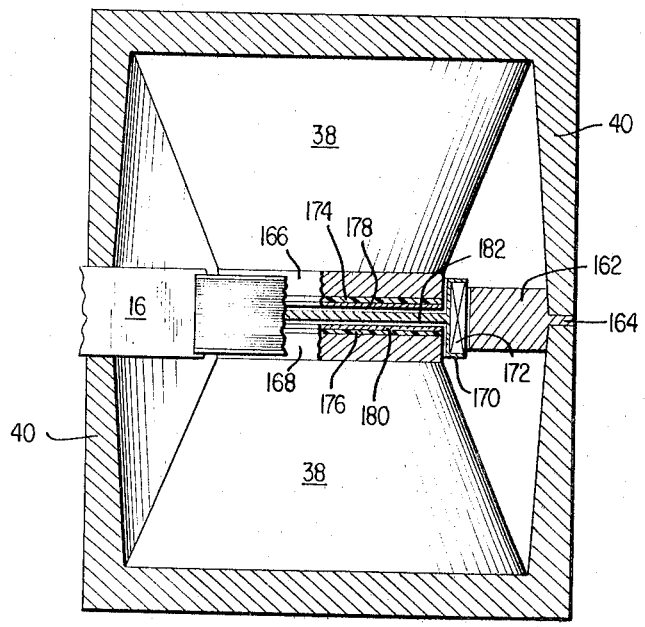
FIGURE 19 shows a modified capacitive sensing unit for the gauge of FIGURE 1.

FIGURE 19 shows a modified construction for the spool and capacitor plate assembly of the gauge of FIGURE 1. In FIGURE 19, like parts bear like references. In the embodiment of FIGURE 19 the conical permanent magnets 38 are again enclosed by cups 40. Spaced between the cups 40 is a single soft iron ring 162 having a flange 164 received between the cups. The ring and cups are of course suitably cut away to provide clearance for support 16. The permanent magnets are provided with soft iron disk shoes 166 and 168 and the ring 162 surrounds a modified spool 170. Passing around the spool 170 is the double winding 172.

In the embodiment of FIGURE 19, each of the disks 166 and 168 is coated with a layer of insulation 174 and 176, and these insulation layers are in turn covered by flat metal conductor plates 178 and 180. These latter two plates constitute the two stationary plates of the differential capacitor. The spool 170 again carries the movable capacitor plate 182. As can be seen in this embodiment the fixed plates take the form of metal plates rather than the insulating plates coated with conductive metal as in the previous embodiment.

Figure 20:
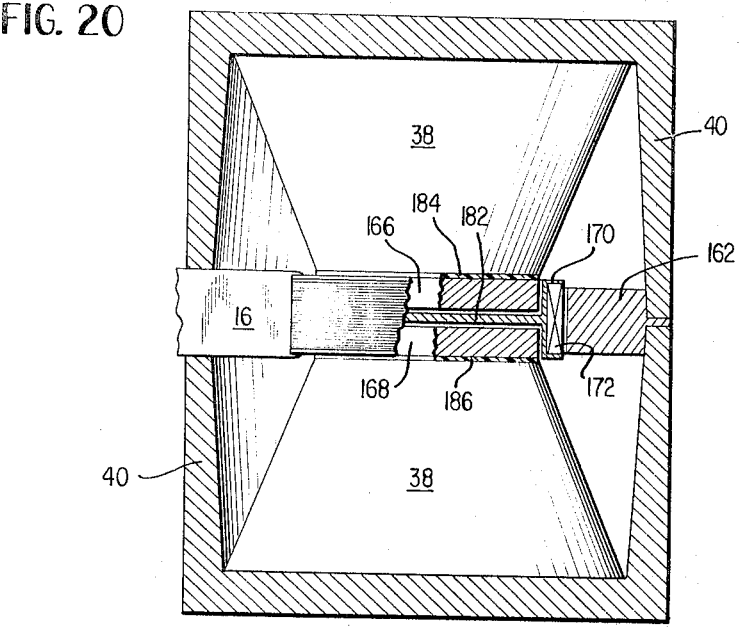
FIGURE 20 shows a further modified sensing unit for the gauge of FIGURE 1.

FIGURE 20 shows a further modified embodiment with like parts again bearing like reference numerals. In this embodiment the spool 170 carries the two windings 172 and again is provided with the single movable capacitor plate 182. In this embodiment, the soft metal shoes or disks 166 and 168 are separated from the permanent magnets 38 by the respective layers of insulation 184 and 186. Hence, in this embodiment the shoes or soft iron disks 166 and 168 not only act in the magnetic circuit but also act as the fixed plates of the differential capacitor.

It is apparent from the above that the present invention provides a novel viscosity gauge particularly suited for measuring skin friction, especially at the high temperatures occasioned by earth atmosphere re-entry forces. The instrument employs a small sensing element which is a portion of the surface where it is desired to measure the skin friction drag. This small element is free to move relative to surrounding area, that is, is free to pivot about a preferred axis, but the novel suspension employed holds the sensing element rigid to rotation around any other axis and further resists a linear motion in any axis. The clearance between the sensing element and its surrounding structure is maintained quite small, i.e., in the order of only 0.001 inch to prohibit flow of gases around the drag element. Pivoting of the sensing element causes a change in a differential capacitance which acts through electrical circuitry to produce a corresponding indication current. The flow of current through a coil mechanically attached to the pickoff and sensing element and located in a strong magnetic field creates a force which opposes the outside force, which tends to cause displacement of the sensing element. The measure of this restoring current is a measure of the external force.

The novel gauge employs electrical circuitry that is contained in the same case as the mechanical parts, thus providing an instrument of small size, great ruggedness, higher accuracy and greater range than heretofore possible. The mechanical construction employed permits the measuring end, that is, the sensing element, to be subjected to temperatures in the order of 2000° F. during the measurement. This enables its use not only in space re-entry vehicles but also in high Mach number shock tubes, blast furnaces, and other high temperature applications.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A skin friction gauge comprising an elongated sensing element having a drag surface at one end, a forcer coil and movable capacitor plate at the other end of said sensing element, a flexible arm suspension arrangement intermediate the ends of said element restricting said element against translation and permitting pivotal movement of said element about only a single axis parallel to said drag surface, and electrical means coupling said movable plate to said forcer coil for applying a restoring force to said body offsetting the skin friction forces acting on said drag surface.

2. A gauge according to claim 1 including heat shield means separating said drag surface from said forcer coil and movable capacitor plate.

3. A skin friction gauge comprising a skin friction sensing element having a drag surface, a support for mounting said sensing element with said drag surface flush with a surface subject to skin friction forces, a plurality of flexible arms suspending said sensing element from said support, said arms resisting translation of said element and pivotal movement of said element about all but one axis, a spool on said sensing element, a forcer coil wound around said spool, the web of said spool forming a movable capacitor plate, at least one stationary capacitor plate adjacent said web, a permanent magnet having its flux passing through said forcer coil, and means for feeding an electrical signal to said forcer coil representative of the distance between said movable and stationary capacitor plates.

4. A gauge according to claim 3 wherein said arms are flat elongated strips of electrically conductive metal having a rectangular cross section, said strips being flexible only in the direction of the shorter dimension of said cross section.

5. A skin friction gauge comprising a skin friction sensing element having a drag surface, a support for mounting said element with said drag surface flush with the surface of a space vehicle, at least one pair of crossed flexible arms suspending said sensing element from said support for pivotal movement of said element about an axis parallel to the drag forces acting on said drag surface, a movable capacitor plate and forcer coil carried by said sensing element, heat shield means between said drag surface and said movable capacitor plate and forcer coil, and means for supplying a signal to said forcer coil representative of the position of said movable capacitor plate.

6. A skin friction gauge comprising a skin friction sensing element having a drag surface contoured for mounting flush with a surface subject to skin friction forces, a case for said sensing element, a cooling jacket around said case, a stationary suspension support secured to said case, a movable suspension support secured to said sensing element, a plurality of insulating blocks mounted on said suspension supports, two pair of crossed flexible arms secured to said blocks and pivotally suspending said sensing element, a spool carried by said movable suspension support, a forcer coil around said spool, the web of said spool forming a movable capacitor plate, a pair of stationary capacitor plates adjacent said movable plate, a pair of soft iron cups, a permanent magnet in each said cup having a pole adjacent said coil whereby the flux from said magnets passes through said forcer coil, an A.C. generator for energizing said capacitor plates, and means for feeding a signal to said forcer coil representative of the position of said movable plate, said signal through said forcer coil acting to oppose the skin friction forces acting on said drag surface.

7. A gauge according to claim 6 including a meter for reading the current through said forcer coil.

8. A gauge according to claim 7 wherein said permanent magnets are provided with soft iron pole pieces each supporting an insulated disk, and said stationary capacitor plates each comprising at least one metal coating on said disks.

9. A gauge according to claim 7 wherein said permanent magnets are provided with soft iron pole pieces, and a layer of insulation on said pole pieces spacing each said pole piece from one of said stationary capacitor plates.

10. A gauge according to claim 7 wherein said permanent magnets are provided with soft iron pole pieces forming said stationary capacitor plates.

References Cited by the Examiner

UNITED STATES PATENTS

| | | | |
|---|---|---|---|
| 2,734,736 | 2/1956 | Payne | 73—398 X |
| 2,829,520 | 4/1958 | Stanton | 73—398 |
| 2,885,890 | 5/1959 | Liccini et al. | 73—147 |
| 2,935,870 | 5/1960 | Lyons | 73—147 |

DAVID SCHONBERG, *Primary Examiner.*